United States Patent [19]
Tsukamoto

[11] Patent Number: 4,592,075
[45] Date of Patent: May 27, 1986

[54] PHASE-SHIFT KEYING DEMODULATOR

[75] Inventor: Akihito Tsukamoto, Soma, Japan

[73] Assignee: Alps Electric Co., Ltd., Japan

[21] Appl. No.: 694,202

[22] Filed: Jan. 24, 1985

[30] Foreign Application Priority Data

Jan. 25, 1984 [JP] Japan .................................. 59-11389

[51] Int. Cl.$^4$ .......... H04L 27/22; H03D 3/06; H03D 3/18
[52] U.S. Cl. ..................................... 375/81; 329/50; 329/112; 329/124; 375/83; 375/86; 455/265
[58] Field of Search .................................. 375/52–54, 375/83, 85, 86, 120, 81, 97; 455/208, 258, 265; 329/50, 112, 122, 124

[56] References Cited

U.S. PATENT DOCUMENTS

| | | | |
|---|---|---|---|
| 3,204,185 | 8/1965 | Robinson | 455/265 |
| 3,594,651 | 7/1971 | Wolejsza, Jr. | 329/122 |
| 3,990,016 | 11/1976 | Dimon | 329/124 |
| 4,092,606 | 5/1978 | Lovelace et al. | 375/54 |
| 4,137,505 | 1/1979 | Guanella | 329/124 |
| 4,143,322 | 3/1979 | Shimamura | 329/124 |
| 4,188,589 | 2/1980 | Brown et al. | 329/122 |
| 4,238,739 | 12/1980 | Mosley et al. | 329/122 |
| 4,255,713 | 3/1981 | Yoshida | 329/50 |
| 4,318,049 | 3/1982 | Mogensen | 375/86 |
| 4,336,500 | 6/1982 | Attwood | 329/50 |
| 4,359,692 | 11/1982 | Ryan | 329/50 |
| 4,408,351 | 10/1983 | Maurer et al. | 455/265 |
| 4,470,145 | 9/1984 | Williams | 329/50 |
| 4,517,680 | 5/1985 | Betts et al. | 329/50 |

FOREIGN PATENT DOCUMENTS 0140746 10/1981 Japan ..................................... 375/97

Primary Examiner—Marc E. Bookbinder
Attorney, Agent, or Firm—Guy W. Shoup

[57] ABSTRACT

A PSK demodulator has two phase detectors for detecting the phase of a PSK signal and a carrier generator for supplying carriers of different phases to the two phase detectors, respectively. The PSK demodulator also includes squaring means for squaring output signals from the two phase detectors, difference computing means for computing the difference between output signals from the squaring means, product computing means for computing the product of the output signals from the two phase detectors, and product detecting means for detecting the product of an output signal from the product computing means and an output signal from the difference computing means, the arrangement being such that the frequencies and phases of the carriers generated by the carrier generator are controlled by an output signal from the product detecting means.

3 Claims, 8 Drawing Figures

Fig. 4

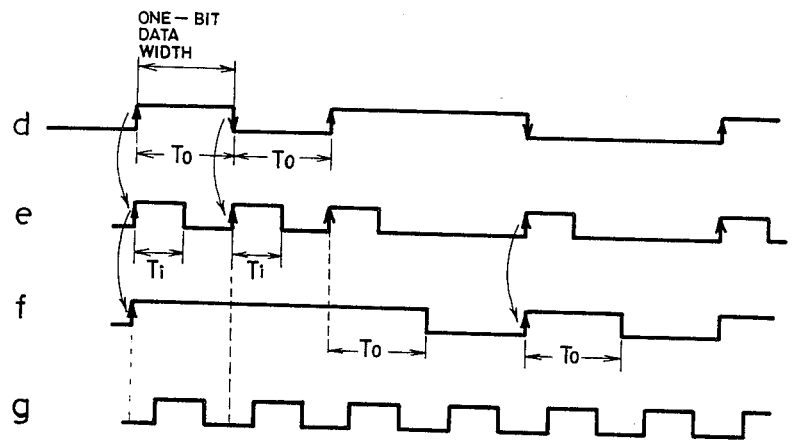

Fig. 6

| INPUT SIGNAL \ OUTPUT SIGNAL | c | c' | h | h' | p |
|---|---|---|---|---|---|
| ① $\sin \omega t$ | $\frac{1}{2}\sin\theta$ | $\frac{1}{2}\cos\theta$ | $\frac{1}{4}\sin^2\theta$ | $\frac{1}{4}\cos^2\theta$ | + |
| ② $\cos \omega t$ | $\frac{1}{2}\cos\theta$ | $-\frac{1}{2}\sin\theta$ | $\frac{1}{4}\cos^2\theta$ | $\frac{1}{4}\sin^2\theta$ | − |
| ③ $-\sin \omega t$ | $-\frac{1}{2}\sin\theta$ | $-\frac{1}{2}\cos\theta$ | $\frac{1}{4}\sin^2\theta$ | $\frac{1}{4}\cos^2\theta$ | + |
| ④ $-\cos \omega t$ | $-\frac{1}{2}\cos\theta$ | $\frac{1}{2}\sin\theta$ | $\frac{1}{4}\cos^2\theta$ | $\frac{1}{4}\sin^2\theta$ | − |

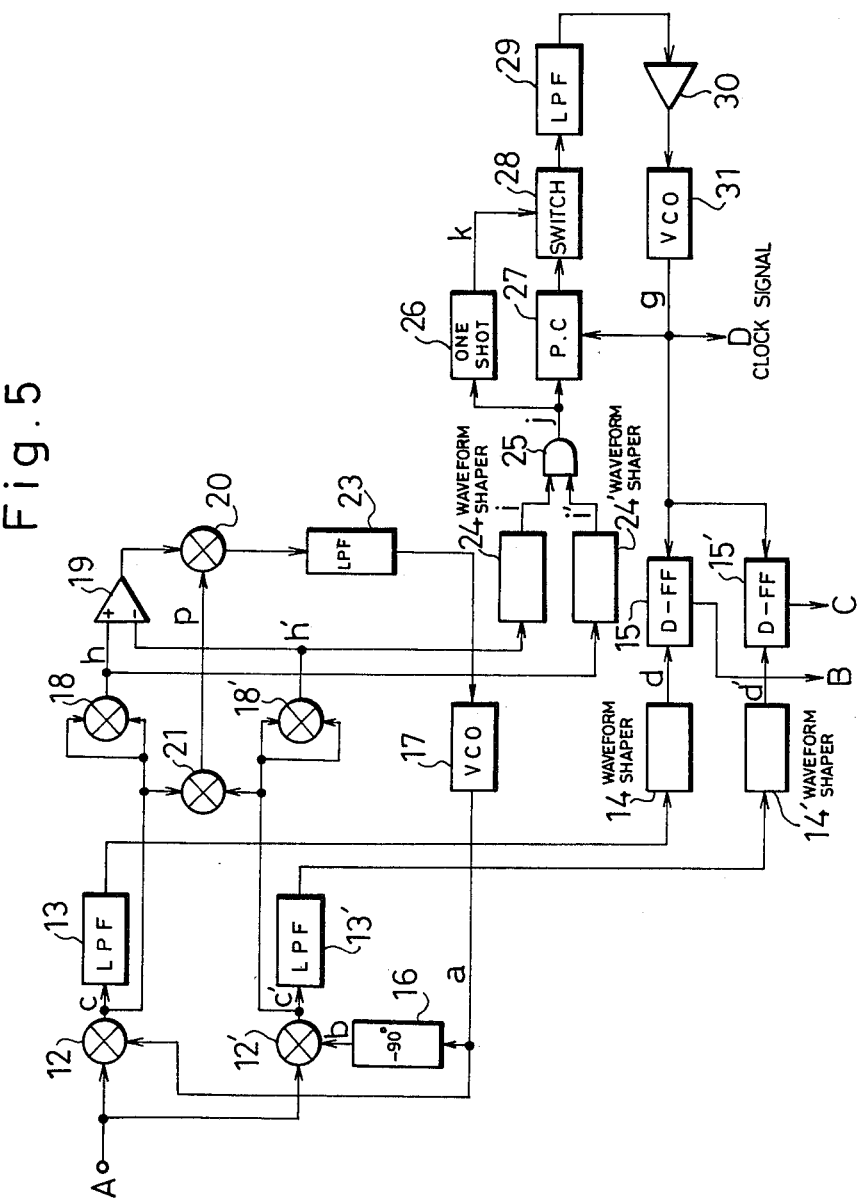

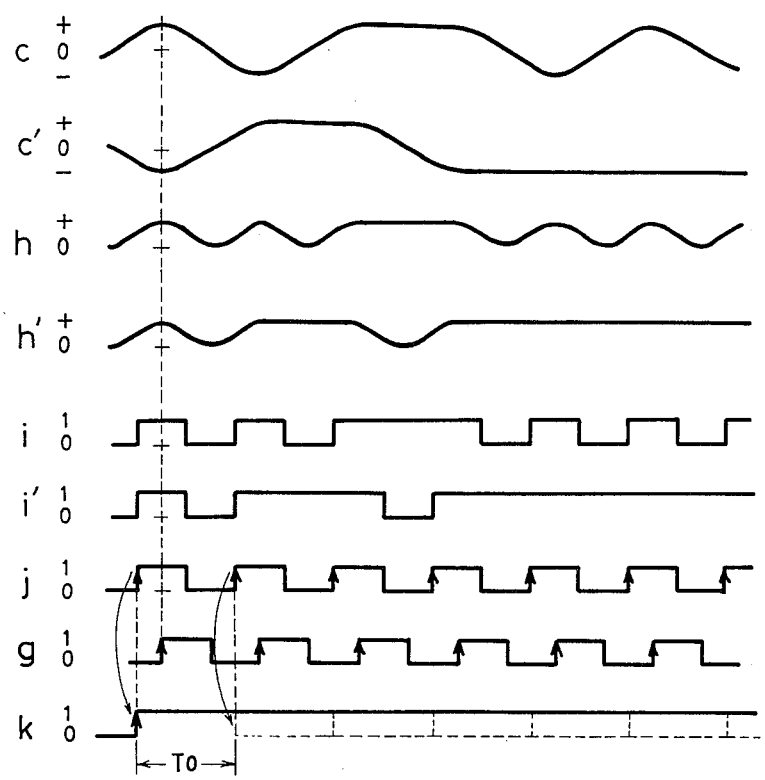

4,592,075

PHASE-SHIFT KEYING DEMODULATOR

BACKGROUND OF THE INVENTION

The present invention relates to a phase-shift keying (PSK) demodulator, and more particularly to a phase-shift keying demodulator for restoring digital data by reproducing a carrier and a clock signal from a signal modulated by PSK.

For demodulating a PSK signal, it is necessary to reproduce a carrier and a clock signal which are suppressed in principle.

There has heretofore been employed a quadruple system in which a received four-phase PSK signal is multiplied by four and then frequency-divided by four to erase phase information for thereby reproducing a desired carrier. The quadruple system is however liable to be affected by a data pattern contained in the received singal. Where data are received which are successive in the order of $\sin \omega t$, $-\cos \omega t$, $-\sin \omega t$ and $\cos \omega t$, the frequency of the reproduced carrier tends to be shifted so that no stable carrier can be obtained.

When reproducing a clock signal from the detected signal for bit synchronization, it is difficult to generate stably a pulse signal having a duty cycle of 50% with respect to a data bit width, and therefore it is difficult to produce a stable clock signal with a phase comparator composed of a simple exclusive-OR logic circuit.

SUMMARY OF THE INVENTION

It is an object of the present invention to eliminate the above conventional problems by detecting a PSK signal with two carriers having different phases, squaring the detected signals to erase their polarity, and thereafter controlling the frequencies and phases of the carriers by negative feedback based on the difference between the signals for stable signal detection.

According to the present invention, there is provided a PSK demodulator having two phase detectors for detecting the phase of a PSK signal and a carrier generator for supplying carriers of different phases to the two phase detectors, respectively, the PSK demodulator also including squaring means for squaring output signals from the two phase detectors, difference computing means for computing the difference between output signals from the squaring means, product computing means for computing the product of the output signals from the two phase detectors, and product detecting means for detecting the product of an output signal from the product computing means and an output signal from the difference computing means, the arrangement being such that the frequencies and phases of the carriers generated by the carrier generator are controlled by an output signal from the product detecting means.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a timing chart showing operation of the conventional PSK demodulator of FIG. 3;

FIG. 5 is a block diagram of a PSK demodulator according to the present invention;

FIG. 6 is a diagram showing operation of the PSK demodulator of the present invention; and FIG. 7 is a timing chart showing operation of the PSK demodulator of the present invention.

DETAILED DESCRIPTION

Figure 1:
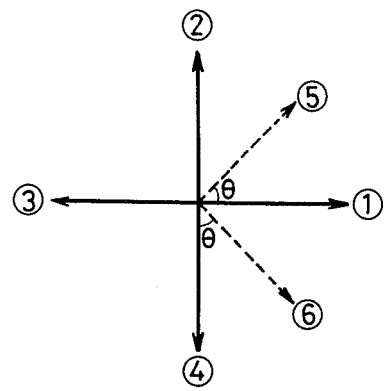
FIGS. 1, 2A and 2B are illustrative of operation of a PSK demodulator.

Like or corresponding parts are denoted by like or corresponding reference characters throughout several views.

Figure 3:
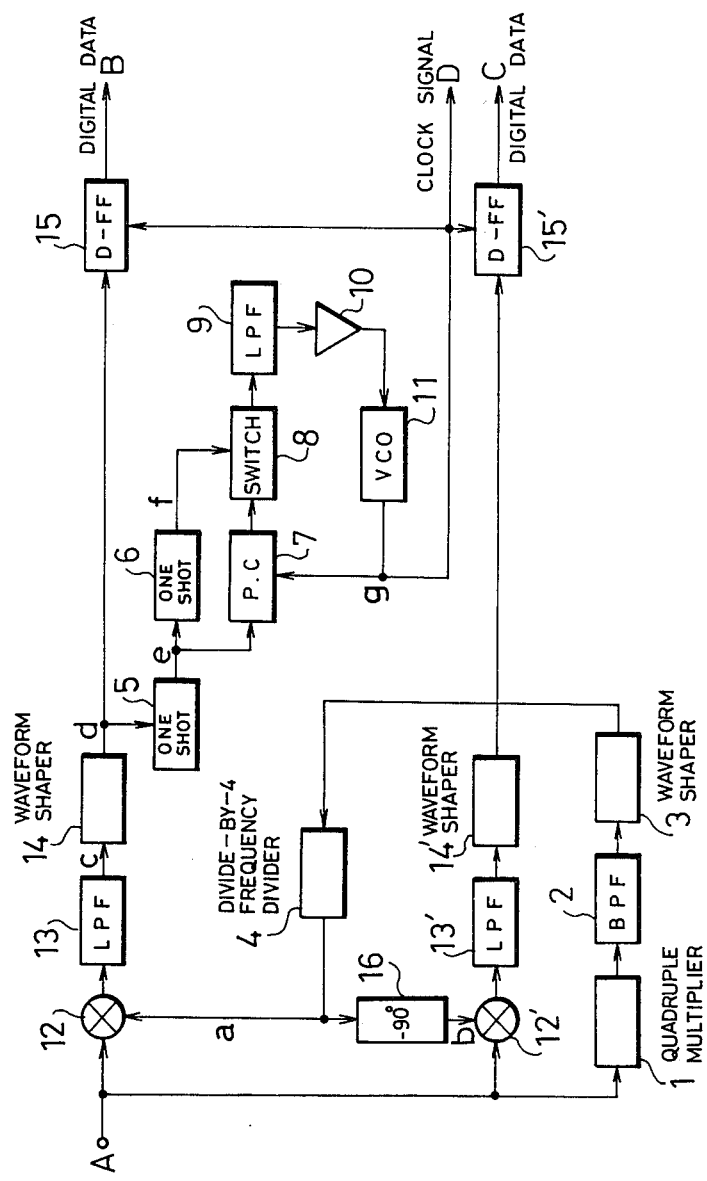
FIG. 3 is a block diagram of a conventional PSK demodulator.

Designated in FIGS. 3 and 5 at 1 a quadruple multiplier, 2 a bandpass filter, 3, 14, 14', 24, 24' waveform shapers, 4 a divide-by-4 frequency divider, 5, 6, 26 one-shot multivibrators, 7, 27 phase comparators, 8, 28 switches, 9, 13, 13', 23, 29 low-pass filters, 10, 30 amplifiers, 11, 31 voltage-controlled oscillators, 12, 12', 18, 18', 20, 21 multipliers, 15, 15' D-type flip-flops, 16 a phase shifter, 19 a differential amplifier, and 25 an AND circuit.

As shown in FIG. 1, arrows (1) through (4) indicate phases of a four-phase PSK signal at respective four values thereof which are angularly equally spaced by 90 degrees. The signals at the respective phases can generally be expressed by $\sin \omega t$, $\cos \omega t$, $-\sin \omega t$, and $-\cos \omega t$, respectively.

Arrows (5) and (6) are indicative of phases of reproducing carriers required for phase detection. Where $\angle 4$ is 45 degrees, $\sin \theta = \cos \theta$, which is a condition preferred for detection as described below.

Figure 2A:
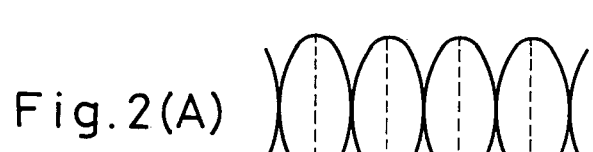
Figure 2B:
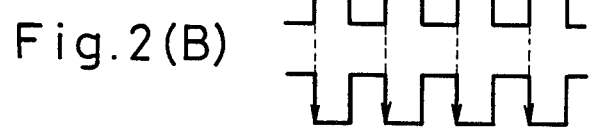

FIG. 2A shows the waveform of an output signal generated by detecting a four-phase PSK signal, the waveform being called an eye pattern. Since digital data is required to be sampled at maximum amplitudes of the eye pattern, a clock signal for sampling the data has to have rising or falling edges at the maximum amplitudes of the eye pattern as illustrated in FIG. 2B.

A carrier reproducing system employed in a conventional four-phase PSK demodulator shown in FIG. 3 is a so-called quadruple system in which a carrier a is reproduced from a four-phase PSK signal A by the components designated at 1 through 4. More specifically, the frequency of the four-phase PSK siganl A is quadrupled by the quadruple multiplier 1 to elimiate phase information. The multiplied signal is then passed through a bandpass filter 2 which picks up a signal of a fourfold frequency that is applied to the waveform shaper 3. A shaped signal issued from the waveform shaper 3 is then applied to the divide-by-4 frequency divider 4 which produces the desired carrier a with its frequency divided by four. In the quadruple system, however, the freuqency of the reproduced carrier a sometimes tends to be shifted where a particular data patter such as of $\sin \omega t$, $-\cos \omega t$, $-\sin \omega t$ and $\cos \omega t$ is received. Although this problem can be eliminated by so-called quenching to initialize the bandpass filter 2 when the data pattern is varied, such a solution makes it difficult to match timing.

A clock signal used for bit synchronization in the conventional device shown in FIG. 3 is reproduced from a detected output signal d by the components denoted at 5 through 11. More specifically, the one-shot multivibrator 5 produces a pulse signal e (indicated at e in FIG. 4) having a prescribed width Ti with rising and falling edges of the detected output signal d, and the pulse signal e is applied to the other one-shot multivibrator 6 and the phase comparator 7. The one-shot multivibrator 6 is retriggerable to generate a pulse singal f (indicated at f in FIG. 4) of a width such as equal to a one-bit data width To shown in FIG. 4 each time a rising edge of the pulse signal e is detected, and applies the pulse signal f to the switch 8. The switch 8 comprises an analog switch, for example, and supplies a signal from the phase comparator 7 to the low-pass filter 9 only when the pulse signal f is in the ON state. A signal from the low-pass filter 9 is amplified by the amplifier 10, and the amplified signal is then applied to the voltage-controlled oscillator 11 which issues a clock signal g (indicated at g in FIG. 4) of ceratin time intervals to the phase comparator 7. The above arrangement constitutes a PLL (phase-locked loop) to produce the clock signal g in synchronism with the signal d. The prior construction is however disadvantageous in that when a preset pulse width in the one-shot multivibrator is varied, no pulse signal of a duty cycle of 50% can be produced, and a simple and stable circuit such as an exclosive-OR phase comparator cannot be employed as the phase comparator 7. Furthermore, the optimum timing of the clock signal corresponds to the falling edges of the pulse signal e, as shown in FIG. 4, making unstable the characteristics of the feedback loop because of the phase characteristics of the exclusive-OR phase comparator. Solving this shortcoming requires a 90°-phase shifter connected to an output terminal of the voltage-controlled oscillator 11 or another phase comparator having a wide detecting range.

As is known in the art, the four-phase PSK signal is demodulated by applying the four-phase PSK signal A and the carrier a reproduced by the quadruple system, as shown in FIG. 3, to the multiplier 12, applying an output signal from the multiplier 12 to the low-pass filter 13 to extract a signal component c corresponding to the phase difference, and thereafter shaping the waveform of the signal c with the waveform shaper 14 to produce the detected output signal d. The clock signal g reproduced by the components 5 through 11 is supplied to the D-type flip-flop 15 to extract prescribed digital data B from the detected output signal d. In addition, after delaying the phase of the carrier a by 90 degrees with the phase shifter 16, the delayed carrier signal b is applied to the multiplier 12', rom which digital data C is obtained through the low-pass filter 13', the waveform shaper 14', and the D-type flipflop 15'.

According to the present invention, a PSK signal is detected with carriers having difference phases, and the detected signals are squared to erase their polarity, followed by negative feedback control of the frequencies and phases of the carriers based on the difference between the signals for stable detection.

A process for demodulating a four-phase PSK signal in the device of the invention will be described with reference to FIG. 5.

For generating a detected output signal d, a four-phase PSK siganl A and a carrier a issued from the voltage controlled oscillator 17 which constitutes a PLL, described later, are applied to the multiplier 12, an output signal of which is fed to the low-pass filter 13 to extract a signal c (indicated at c in FIG. 7) having a frequency corresponding to the phase difference between the signals A and a. The signal c is then applied to the waveform shaper 14 which issues a detected output signal d, from which digital data B is extracted by a clock signal g, described later, supplied to the D-type flip-flop 15.

Likewise, digital data C is extracted through the multiplier 12', the low-pass filter 13', the waveform shaper 14', and the D-type flip-flop 15' from the four-phase PSK signal A and a carrier which is 90 degrees delayed in phase from the carrier a issued from the voltage-controlled oscillator 17.

An arrangement and operation for reproducing the carrier a from the four-phase PSK signal A will be described with reference to FIG. 5.

The carrier a issued from the voltage-controlled oscillator 17 and the four-phase PSK signal A are applied to the multiplier 12, and the signal detected by the multiplier 12 is squared by the multiplier 18 to erase the polarity of the signal, thus producing a signal with its polarity erased, that is, an output h (indicated at h in FIG. 7) in the form of $\sin^2\theta$ or $\cos^2\theta$.

Similarly, the four-phase signal A and the carrier which is 90 degrees delayed in phase from the carrier a from the voltage-controlled oscillator 17 are applied to the multiplier 12', an output signal from which is fed to the multiplier 18' to produce a signal h' (indicated at h' in FIG. 7) with its porality erased.

The signals h and h' ($\sin^2\theta$ or $\cos^2\theta$) thus produced are applied to the differential amplifier 19 which produces a differential signal ($\sin^2\theta - \cos^2\theta$) or ($\cos^2\theta - \sin^2\theta$). The differential signal and a polarity signal p issued from the multiplier 21 are applied to the multiplier 20.

As described above, the four-phase PSK signal is expressed in the form having the phases (1) through (4) as shown in FIG. 1. Where the phase of the carrier a supplied to the multipliers 12, 12' for phase detection is selected to be $\theta = 45$ degrees at (5) and (6) in FIG. 1, $\sin\theta = \cos\theta$, and the differential output signal ($\sin^2\theta - \cos^2\theta$) or ($\cos^2\theta - \sin^2\theta$) from the differential amplifier 19 should be zero so as to constitute a PLL.

The signals c, c' can be produced by detecting PSK signals corresponding to the phases (1) through (4) in the column of the input signals shown in FIG. 6 with the multiplifiers 12, 12'. The signals obtained by multiplying the signals c, c' with the multiplier 12 have signs as indicated in the column p of FIG. 6. The signals produced by squaring the signals c, c' are as shown in the columns h, h'. Therefore, by multiplying, with the multiplier 20, the output signal ($\sin^2\theta - \cos^2\theta$) or ($\cos^2\theta - \sin^2\theta$) from the differential amplifier 19 of FIG. 5 by signal p having the sign indicated in the column p of FIG. 6, a signal can be obtained at all times in the form of ($\sin^2\theta - \cos^2\theta$). By feeding the signal from the multiplier 20 to the voltage-controlled oscillator 17 through the low-pass filter 23 via a negative feedback loop, there is obtained the carrier a having a desired frequency and phase shown at (5) in FIG. 1 with $\theta = 45$ degrees. The carrier b can be produced by delaying the phase of the carrier a by 90 degrees.

The reproduction of a clock signal for bit synchronization will be described in detail with reference to FIGS. 5 and 7.

The signals h, h' (indicated at h, h' in FIG. 7) squared by the multiplifers 18, 18' shown in FIG. 5 are applied to the waveform shapers 24, 24', respectively, which generate shaped signals i, i' (indicated at i. i' in FIG. 7), respectively. The signals i, i' are then fed to the AND circuit 25 which issues an signal j (indicated at j in FIG. 7) indicative of a logical product. Although it is possible to sample digital data B, C from the signals d, d' using the signal j, a PLL circuit is driven for increased stability and reliability. To this end, the signal j is supplied to the one-shot multivibrator 26 and the phase comparator 27. The one-shot multivibrator 26 is retriggerable to produce a signal k (indicated at k in FIG. 7) having a pulse width corresponding to the one-bit data width To with rising edges of the signal j indicated by the arrows in FIG. 7. The switch 28 comprising an analog switch, for example, is driven by the signal k. The switch 28 serves to increase the gain of the PLL. An output from the phase comparator 27 is supplied through the switch 28, the low-pass filter 29, and the amplifier 30 to the voltage-controlled oscillator 31, an arrangement which constitutes the PLL for stably and reliably reproducing the clock signal g (indicated at g in FIG. 7) in synchronism with the signals h, h'. Since the synchronizing signal is extracted after the detected signal has been squared, any unstability encountered in forming the pulse signal of a duty cycle of 50% with the conventional one-shot multivibrator 5 shown in FIG. 3 is eliminated, and a phase comparator such for example as an exclusive-OR phase comparator of a simple construction can be employed.

With the arrangement of the present invention, as described above, a PSK signal is detected with carriers of different phases, the detected signals are squared to erase their polarity, and thereafter the frequencies and phases of the carriers are controlled by negative feedback based on the difference between the detected signals. Therefore, the frequencies of the carriers reproduced will not be shifted which would otherwise be shafted by a certain data pattern as in the quadruple system, and the reproduced carriers can reliably be brought into synchronism. The reproduced carriers can reliably be brought into synchronism particularly because their frequencies and phases are controlled by feeding phase error signals contained in the output signals from the phase detectors (multipliers 12, 12') directly to the carrier oscillator (voltage-controlled oscillator 17) through a negative feedback loop. Since the PLL includes no digital circuit, it requires no waveform shaper and is simple in circuit arrangemetnt for easier stabilization of the reproduced carrier.

Although a certain preferred embodiment has been shown and described, it should be understood that many changes and modifications may be made therein without departing from the scope of the appended claims.

What is claimed is:

1. A PSK demodulator having two phase detectors for detecting the phase of a PSK signal and a carrier generator for supplying carriers of different phases to the two phase detectors, respectively, said PSK demodulator comprising squaring means for squaring output signals from said two phase detectors, difference computing means for computing the difference between output signals from the squaring means, product computing means for computing the product of the output signals from said two phase detectors, and product detecting means for detecting the product of an output signal from said product computing means and an output signal from said difference computing means, the arrangement being such that the frequencies and phases of the carriers generated by said carrier generator are controlled by an output signal from said product detecting means.

2. A PSK demodulator according to claim 1, wherein said squaring means comprises a pair of multipliers for squaring the output signals, respectively, from said two phase detectors.

3. A PSK demodulator according to claim 2, wherein said difference computing means comprises a differential amplifier for determining the difference between output signals from said multipliers.

* * * * *